United States Patent
Laur et al.

(10) Patent No.: US 10,317,220 B2
(45) Date of Patent: Jun. 11, 2019

(54) ALIGNMENT OF MULTIPLE DIGITAL MAPS USED IN AN AUTOMATED VEHICLE

(71) Applicant: Aptiv Technologies Limited, St. Michael (BB)

(72) Inventors: Michael H. Laur, Mission Viejo, CA (US); Brian R. Hilnbrand, Mountain View, CA (US); Divya Agarwal, Sunnyvale, CA (US)

(73) Assignee: APTIV TECHNOLOGIES LIMITED (BB)

( * ) Notice: Subject to any disclaimer, the term of this patent is extended or adjusted under 35 U.S.C. 154(b) by 118 days.

(21) Appl. No.: 15/690,659

(22) Filed: Aug. 30, 2017

(65) Prior Publication Data

US 2019/0063927 A1 Feb. 28, 2019

(51) Int. Cl.
*G01C 21/30* (2006.01)
*G05D 1/02* (2006.01)

(52) U.S. Cl.
CPC .......... *G01C 21/30* (2013.01); *G05D 1/0274* (2013.01); *G05D 2201/0213* (2013.01)

(58) Field of Classification Search
CPC ...... G01C 21/30; G01C 21/32; G05D 1/0274; G05D 1/0088
See application file for complete search history.

(56) References Cited

U.S. PATENT DOCUMENTS

| 2010/0299370 | A1 | 11/2010 | Otto | |
|---|---|---|---|---|
| 2012/0310516 | A1 | 12/2012 | Zeng | |
| 2017/0008521 | A1* | 1/2017 | Braunstein | G01C 21/32 |

OTHER PUBLICATIONS

European Search Report, dated Jan. 7, 2019.

* cited by examiner

*Primary Examiner* — Anne M Antonucci
*Assistant Examiner* — Renee LaRose
(74) *Attorney, Agent, or Firm* — Lawrence D. Hazelton

(57) ABSTRACT

A navigation system for an automated vehicle includes an object-detector, a first-map, a second-map, and a controller. The object-detector indicates relative-positions of a plurality of objects proximate to the host-vehicle. The first-map indicates a first-object and a second-object detected by the object-detector. The second-map is different from the first-map. The second-map indicates the first-object and the second-object. The controller is in communication with the object-detector, the first-map, and the second-map. The controller is configured to determine a first-coordinate of the host-vehicle on the first-map based on the relative-positions of the first-object and the second-object, determine a second-coordinate of the host-vehicle on the second-map based on the relative-positions of the first-object and the second-object, and align the first-map and the second-map based on the first-coordinate, the second-coordinate, and the relative-positions of the first-object and the second-object.

5 Claims, 2 Drawing Sheets

ALIGNMENT OF MULTIPLE DIGITAL MAPS USED IN AN AUTOMATED VEHICLE

TECHNICAL FIELD OF INVENTION

This disclosure generally relates to a navigation system for an automated vehicle, and more particularly relates to a system that aligns a first-map and a second-map based on the relative-positions of one or more objects.

BACKGROUND OF INVENTION

It is known that automated vehicles may use or be equipped with redundant systems to achieve some degree of functional safety. Map data from multiple sources is often collected in different reference frames and must be aligned before use. This is usually an offline procedure which combines the data which creates a single source failure component when delivered to the vehicle. As such, all map databases could be misaligned relative to world GPS coordinates but should be accurate relatively to ensure use for automated driving

SUMMARY OF THE INVENTION

Described herein is a system that utilizes on-board sensors to determine a location of a host-vehicle on multiple digital maps using a localization object from each of the maps that is determined to be the same object based on perception sensors and statistical analysis of errors. The system rejects instances of objects for alignment when it is not possible to align the multiple relative databases so that the vehicle is located on both databases relative to a second perceived object (e.g. a lane marker) within an error threshold, twenty centimeters (20 cm) for example. It is assumed that a rough positioning on the maps can be made by, for example, a global-position-system (GPS) or other means known to those in the art. The system uses one or more perception sensors that form an object-detector to locate an object such as a street sign, and determines one or more angles (e.g. azimuth and/or elevation) or direction and a distance to that object. The system then correlates, based on object relative position and attributes, this object with an object in a first-map database, and determines the position or coordinates of the host-vehicle on first-map relative to the object. The system also determines the position of the vehicle by a second object identified by the same perception sensor or a second perception sensor, e.g. a relative lateral position to a lane marker or center barrier seen with a camera. A coordinate with statistical errors is calculated using data from the first object and second object. The above procedure is then applied to a second map database. The system then aligns the maps so information from different maps can be used as needed to control operation of the host-vehicle.

In accordance with one embodiment, a navigation system for an automated vehicle is provided. The system includes an object-detector, a first-map, a second-map, and a controller. The object-detector indicates relative-positions of a plurality of objects proximate to the host-vehicle. The first-map indicates a first-object and a second-object detected by the object-detector. The second-map is different from the first-map. The second-map indicates the first-object and the second-object. The controller is in communication with the object-detector, the first-map, and the second-map. The controller is configured to determine a first-coordinate of the host-vehicle on the first-map based on the relative-positions of the first-object and the second-object, determine a second-coordinate of the host-vehicle on the second-map based on the relative-positions of the first-object and the second-object, and align the first-map and the second-map based on the first-coordinate, the second-coordinate, and the relative-positions of the first-object and the second-object.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
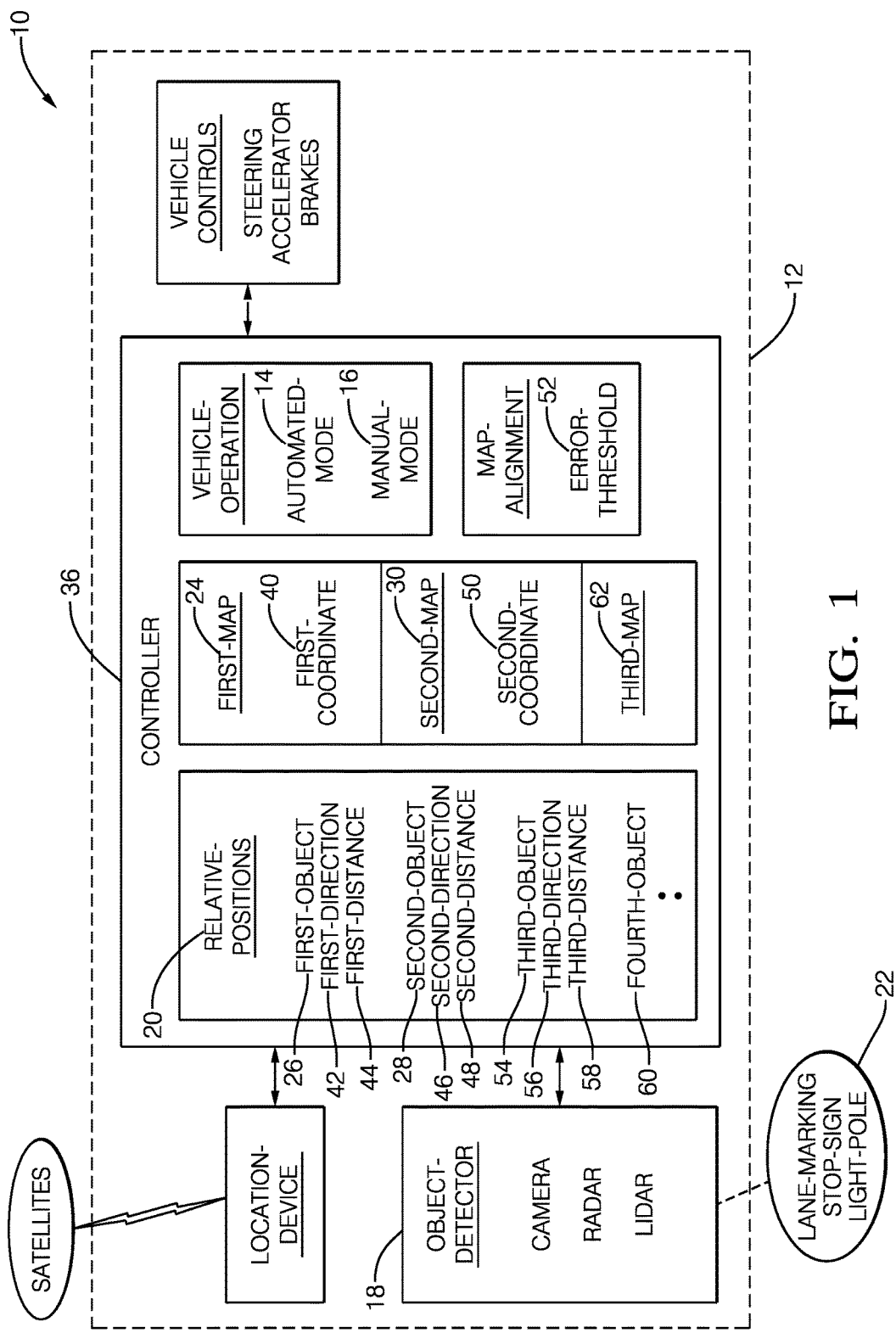
FIG. 1 is a diagram of a navigation system for an automated vehicle in accordance with one embodiment.

FIG. 1 illustrates a non-limiting example of a navigation system 10, hereafter referred to as the system 10, which is suitable for use by an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation provided by the system 10 may be little more than providing audible and/or visual route guidance to the human-operator who is generally in control of the steering, accelerator, and brakes of the host-vehicle 12.

The system 10 includes an object-detector that indicates relative-positions 20 of a plurality of objects 22 proximate to, e.g. within two-hundred-meters (200 m) of, the host-vehicle 12. The object-detector 18 may include or be formed of, but not limited to, a camera, a radar, a lidar, an ultrasonic transducer, or any combination thereof. Those in the art will recognize that there are a wide variety of commercially available devices suitable to use as part of the object-detector 18. While FIG. 1 may be interpreted to suggest that all of the devices (camera, radar, ultrasonics, and/or lidar) that make up the object-detector 18 are co-located, possibly in a unified assembly, this is not a requirement. It is contemplated that the various devices and/or multiple instances of each type of the devices may be distributed at various advantageous locations about the host-vehicle 12.

As will be described in more detail later, the system 10 described herein makes use of multiple digital maps or multiple map databases for operating or providing guidance for the operation of the host-vehicle. For example, the system may include, but is not limited to a first-map 24 (see also FIG. 2) that indicates a first-object 26, e.g. a lane-marking, and a second-object 28, e.g. a stop-sign, that are detected by the object-detector 18. The system 10 may also include a second-map 30 that is different from the first-map 24, e.g. first-map 24 and the second-map 30 are provided by different companies. In order to align with each other the first-map 24 and the second-map 30, there needs to be at least one instance of the same object being indicated on both the first-map 24 and the second-map 30. That is, the second-map 30 may also indicate or show the first-object 26 and the second-object 28.

While FIG. 1 may be interpreted to suggest that the first-map 24 and the second-map 30 are located 'on-board' the host-vehicle 12, this is not a requirement. It is contemplated that one or both of the first-map 24 and the second-map 30 may be stored 'off-board' at some remote location on a remote server that can be accessed using wireless communications such as a wireless Wi-Fi network, or a cellular-phone network, or satellite communications, as will be recognized by those in the art. It is also contemplated that the first-map 24 and the second-map 30 may be different types of maps. For example, one may be characterized as a three-dimensional (3D) model while the other may be more accurately characterized as a two-dimensional (2D) model, possible with some limited elevation information.

Figure 2:
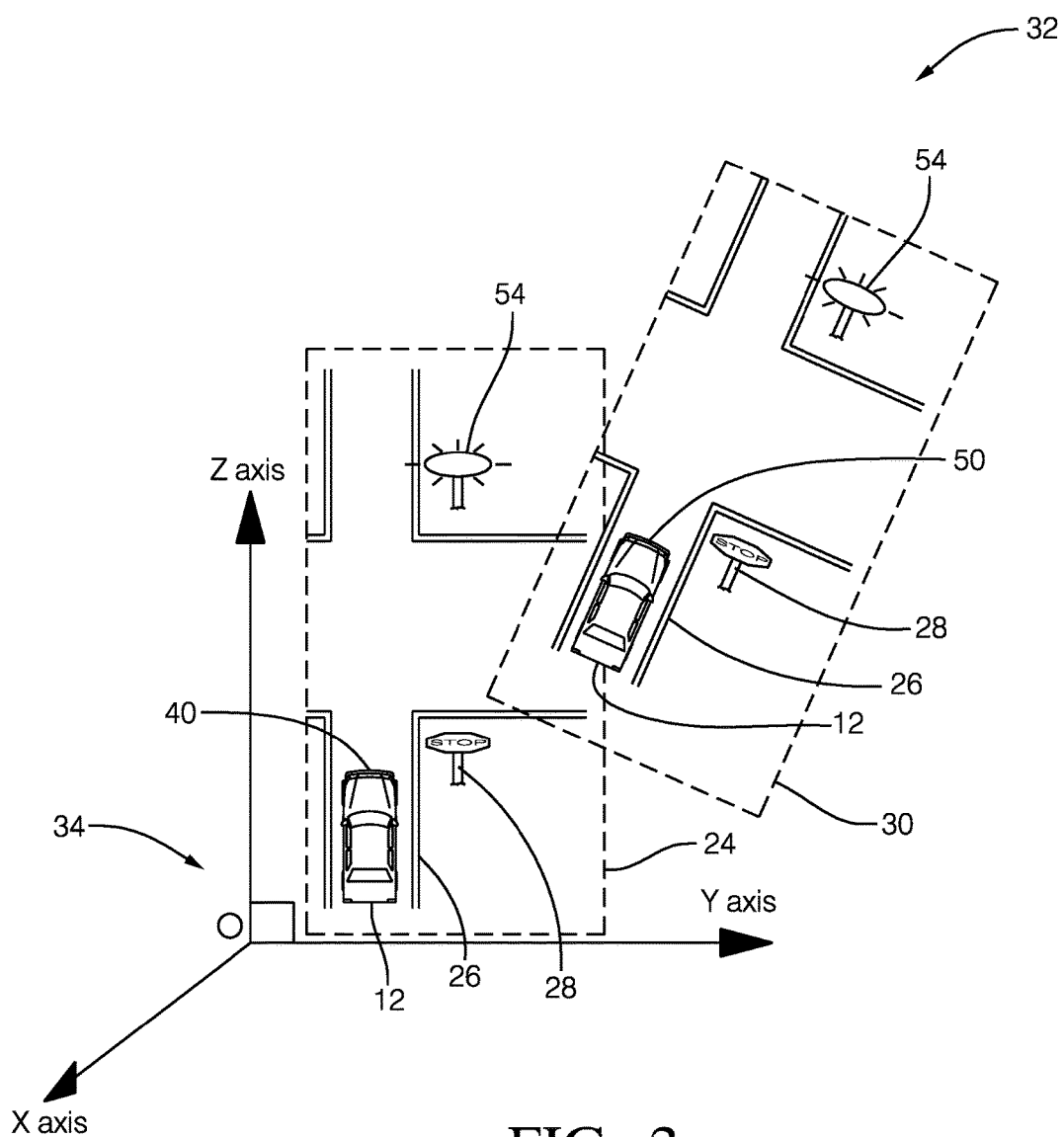
FIG. 2 is an illustration of multiple maps prior to alignment by the system of FIG. 1 in accordance with one embodiment.

FIG. 2 is a non-limiting example of an illustration 32 that shows how the first-map 24 and the second-map 30 may be miss-aligned with respect to each other. The reference-coordinates 34 indicated by the X axis, Y axis, and Z axis may be arbitrarily selected, or may be representative of world-coordinates with the origin (O) being located on the earth with zero error. The host-vehicle 12 is shown on each of the maps to indicate how the location of the host-vehicle 12 on each of the first-map 24 and the second-map 30 is determined based on relative-positions 20 (FIG. 1) of the first-object 26 and the second-object 28. However, because the first-map 24 and the second-map 30 may be miss-aligned with respect to each other, the coordinates of the host-vehicle 12 with respect to the reference-coordinates 34 do not perfectly match. It is recognized that the first-map 24 and the second-map 30 could be aligned using a single instance of the first-object 26 and the second-object 28 if it was assumed that the difference was only due to an error or offset along the X axis and/or Y-axis. However, if there is a rotational difference as suggested in FIG. 2, which could be indicated by a difference in heading indicated by a compass reading by the host-vehicle 12 prior to reaching the indicated positions on the first-map 24 and the second-map 30, then multiple instances of objects, e.g. the first-object 26 and the second-object 28, are needed to align the first-map 24 and the second-map 30.

Returning to FIG. 1, the system 10 may also include a controller 36 in communication with the object-detector 18, the first-map 24, and the second-map 30. The communication with the object-detector 18 may be by way of wires, optical-cable, or wireless communications. Possible ways of communicating with the first-map 24 and the second-map 30 are described above. The controller 36 may include a processor (not specifically shown) such as a microprocessor or other control circuitry such as analog and/or digital control circuitry including an application specific integrated circuit (ASIC) for processing data as should be evident to those in the art. The controller 36 may include memory (not specifically shown), including non-volatile memory, such as electrically erasable programmable read-only memory (EEPROM) for storing one or more routines, thresholds, and captured data. The one or more routines may be executed by the processor to perform steps for determining/identifying the first-object 26 and the second-object 28 based on signals received by the controller 36 from the object-detector 18 as described herein.

In order to align the first-map 24 and the second-map 30, the controller 36 is configured to determine a first-coordinate 40 of the host-vehicle 12 on the first-map 24 based on the relative-positions 20 of the first-object 26 and the second-object 28. The relative-positions 20 may include a first-distance 42 and a first-direction 44 to the first-object 26 and a second-distance 46 and a second-direction 48 to the second-object 28. The first-map 24 may provide or indicate absolute coordinates, e.g. latitude, longitude, elevation, of the first-object 26 and the second-object 28. The first-coordinate 40 of the host-vehicle 12 on the first-map 24 may then be determined using triangulation based on the first-distance 42 and the first-direction 44 to the first-object 26 and the second-distance 46 and the second-direction 48 to the second-object 28.

The controller 36 is also configured to similarly determine a second-coordinate 50 of the host-vehicle 12 on the second-map 30 based on the relative-positions 20 of the first-object 26 and the second-object 28, which may be done in the same way as was done for the first-coordinate 40 using the first-map 24.

Given the first-coordinate 40 and the second-coordinate 50, the controller 36 may then align the first-map 24 and the second-map 30 based on the first-coordinate 40 the second-coordinate 50 by determining relative offsets with respect to the X axis, Y axis, and Z axis of the reference-coordinates 34. However, as previously mentioned, there may be a rotational difference between the first-map 24 and the second-map 30 that may be corrected based on or by making use of the relative-positions 20 of the first-object 26 and the second-object 28, e.g. based on the first-distance 42 and the first-direction 44 to the first-object 26 and the second-distance 46 and the second-direction 48 to the second-object 28. Alternatively, the first-map 24 may indicate absolute-coordinates of the first-object 26 and the second-object 28, and the first-map 24 and the second-map 30 may be aligned, at least linearly, based on the absolute-coordinates of the various objects on the various maps. For example, offsets along the X axis, Y axis, and Z axis of the reference-coordinates 34 may be determined to adjust for any difference in the absolute-coordinates of the first-object 26 indicated by the first-map 24 and the second-map 30, and then the second-map 30 may be rotated about the first-object 26 so a direction or vector from the first-object 26 to the second-object 28 indicated by the second-map 30 is aligned with a similar direction or vector on the first-map 24.

To determine proximity within a lane based on the first-map 24, using the location of the first object 26, the controller 36 could find the closest point to a lane marker polynomial or centerline polynomial to the relative first coordinate 40. This is a method that could be used for further verification of alignment. It is also anticipated that the map database alignment procedure may always be used when new localization objects are detected to maintain the alignment parameters. Alignment parameters may not be constant over even small distances.

It has been observed that a relatively common reason for different maps to disagree is caused by a difference of location of a particular object on the different maps. That is, localization errors are more likely caused by erroneous data regarding the particular object rather than an entire map being grossly miss-aligned with the world, e.g. the reference-coordinates 34. The fundamental cause in some instances has been traced to the particular object having been recently moved, and the map has not been revised or updated to reflect that relocation. Another explanation may be that the position of the particular object on a particular map may simply have been measured or recorded incorrectly. Techniques and methods to detect and correct such errors have been suggested elsewhere, so will not be discussed in any detail here.

In response to this problem, the system 10, or more particularly the controller 36, may be configured to align the first-map 24 and the second-map 30 only when the first-coordinate 40 and the second-coordinate 50 differ by less than an error-threshold 52, twenty-five centimeters (25 cm) for example. That is, if the error is too great, the first-map 24 and the second-map 30 are not aligned in respect to the first-object 26 and the second-object 28. The cause of the error may be due to the aforementioned map errors. Alternatively, the error may be caused by an erroneous measurement made by the object-detector 18. For example, one or more of the first-distance 42, the first-direction 44, the second-distance 46, and/or the second-direction 48 may be in error due to signal noise or an unidentified obstruction.

To address this problem of when the first-coordinate 40 and the second-coordinate do not differ by less than an error-threshold 52, i.e. the error is too large, the controller may be configured to 'discard', for example, the first-object 26 as a basis for aligning the first-map 24 and the second-map 30, and proceed to identify a third-object 54 (e.g. a light-pole) with the object-detector 18 that may be used to align the first-map 24 and the second-map 30. The controller 36 may then determine the first-coordinate 40 of the host-vehicle 12 on the first-map 24 based on the relative-positions 20 of the second-object 28 and the third-object 54, and determine the second-coordinate 50 of the host-vehicle 12 on the second-map 30 based on the relative-positions 20 of the second-object 28 and the third-object 54. That is, the controller 36 may determine a third-direction 56 and a third-distance 58 to the third-object 54, and then replace the previously determined values of the first-coordinate 40 and the second-coordinate 50 with values that were determined based on the relative-positions 20 of the second-object 28 and the third-object 54 instead of the first-object 26 to the second-object 28.

Once the difference is less than the error-threshold 52, the controller may proceed to align the first-map 24 and the second-map 30 based on the first-coordinate 40, the second-coordinate 50, and the relative-positions 20 of the second-object 28 and the third-object 54. It is contemplated that this process of discarding one object as a point of reference and replacing it with a subsequently detected object may be continued until the first-coordinate 40 and the second-coordinate 50 differ by less than the error-threshold 52. For example, if the actual problem was with the second-object 28, the controller may detect a fourth-object 60 and align the maps using the third-object and the fourth-object.

In one respect, this process of discarding objects and selecting new objects until the first-coordinate 40 and the second-coordinate 50 differ by less than the error-threshold 52 may be advantageous as it minimized the number of objects that are tracked at any one time. However, if it is presumed that there will always be some relatively small differences between various maps, and that the measurements by the object-detector 18 may include some modest error, it may be advantageous to take advantage of the general mean-value-theorem and accumulate information from more than two objects to determine the first-coordinate 40 and the second-coordinate 50.

For example, when the first-coordinate 40 and the second-coordinate 50 do not differ by less than the error-threshold 52, the controller 36 may be configured to identify the third-object 54 with the object-detector 18, and then determine the first-coordinate 40 of the host-vehicle 12 on the first-map 24 based on the relative-positions 20 of the first-object 26, the second-object 28, and the third-object 54. For example, three triangulations (first-object 26 & second-object 28; second-object 28 &, third-object 54; and first-object 26 & third-object 54) may be used to determine three individual coordinates, and then these individual coordinates may be averaged to determine the first-coordinate 40.

Similarly, the controller 36 may determine the second-coordinate 50 of the host-vehicle 12 on the second-map 30 based on the relative-positions of the first-object 26, the second-object 28, and the third-object 54 using the above described technique. Accordingly, the controller 36 may then align the first-map 24 and the second-map 30 based on the first-coordinate 40, the second-coordinate 50, and the relative-positions 20 of the first-object 26, the second-object 28, and the third-object 54. As with the previous technique, this averaging technique may be used to include the fourth-object 60, or many more instances of objects.

While the description above, has been limited to aligning the first-map 24 and the second-map 30, it is contemplated that more maps may be aligned, e.g. a third-map 62 may be included that may be, for example, a highly detailed map of a relatively small area such as a drive-through restaurant or other business where it is necessary to dynamically control the movement of multiple vehicles.

Accordingly, a navigation system (the system 10), a controller 36 for the system 10, and a method of operating the system 10 is provided. The system 10 provides for a means to make use of multiple maps or sources of navigation information for navigating the host-vehicle 12, but accommodate occasional errors in one of the maps, and/or occasional errors by the object-detector 18 in determining the relative-positions 20 of the various objects.

While this invention has been described in terms of the preferred embodiments thereof, it is not intended to be so limited, but rather only to the extent set forth in the claims that follow.

We claim:

1. A navigation system for an automated vehicle, said system comprising:
   an object-detector that indicates relative-positions of a plurality of objects proximate to the host-vehicle;
   a first-map that indicates a first-object and a second-object detected by the object-detector;
   a second-map different from the first-map, said second-map indicates the first-object and the second-object; and
   a controller in communication with the object-detector, the first-map, and the second-map, said controller configured to
   determine a first-coordinate of the host-vehicle on the first-map based on the relative-positions of the first-object and the second-object,
   determine a second-coordinate of the host-vehicle on the second-map based on the relative-positions of the first-object and the second-object, and
   align the first-map and the second-map based on the first-coordinate, the second-coordinate, and the relative-positions of the first-object and the second-object.

2. The system in accordance with claim 1, wherein the relative-positions include a first-distance and a first-direction to the first-object and a second-distance and a second-direction to the second-object.

3. The system in accordance with claim 1, wherein the controller is configured to align the first-map and the second-map only when the first-coordinate and the second-coordinate differ by less than an error-threshold.

4. The system in accordance with claim 1, wherein when the first-coordinate and the second-coordinate do not differ by less than an error-threshold, the controller is configured to
- identify a third-object with the object-detector,
- determine the first-coordinate of the host-vehicle on the first-map based on the relative-positions of the second-object and the third-object,
- determine the second-coordinate of the host-vehicle on the second-map based on the relative-positions of the second-object and the third-object, and
- align the first-map and the second-map based on the first-coordinate, the second-coordinate, and the relative-positions of the second-object and the third-object.

5. The system in accordance with claim 1, wherein when the first-coordinate and the second-coordinate do not differ by less than an error-threshold, the controller is configured to
- identify a third-object with the object-detector,
- determine the first-coordinate of the host-vehicle on the first-map based on the relative-positions of the first-object, the second-object, and the third-object,
- determine the second-coordinate of the host-vehicle on the second-map based on the relative-positions of the first-object, the second-object, and the third-object, and
- align the first-map and the second-map based on the first-coordinate, the second-coordinate, and the relative-positions of the first-object, the second-object, and the third-object.

* * * * *